United States Patent [19]

Murai et al.

[11] Patent Number: 5,393,866
[45] Date of Patent: Feb. 28, 1995

[54] METHOD FOR THE PRODUCTION OF POLYTETRAMETHYLENE ETHER GLYCOL

[75] Inventors: Nobuyuki Murai; Masayuki Shirato; Hiroshi Takeo, all of Yokkaichi; Hidetoshi Tanaka, Suzuka, all of Japan

[73] Assignee: Mitsubishi Kasei Corporation, Tokyo, Japan

[21] Appl. No.: 149,779

[22] Filed: Nov. 10, 1993

[30] Foreign Application Priority Data

Nov. 11, 1992 [JP] Japan ................................. 4-300921

[51] Int. Cl.$^6$ ..................... C08G 59/68; C08G 65/04; C07C 43/02
[52] U.S. Cl. ................................... 528/403; 528/408; 568/679; 568/680
[58] Field of Search ............... 528/403, 408; 568/679, 568/680

[56] References Cited

U.S. PATENT DOCUMENTS

| | | | |
|---|---|---|---|
| 3,778,480 | 12/1973 | Matsuda et al. | |
| 4,521,571 | 6/1985 | Ishida et al. | 528/301 |
| 4,539,394 | 9/1985 | Fukuda et al. | 528/354 |
| 5,130,470 | 7/1992 | Dorai et al. | 568/617 |

FOREIGN PATENT DOCUMENTS

| | | |
|---|---|---|
| 0342862 | 11/1989 | European Pat. Off. |
| 48-999 | 1/1973 | Japan . |
| 1-37408 | 8/1989 | Japan . |

*Primary Examiner*—John Kight, III
*Assistant Examiner*—John M. Cooney, Jr.
*Attorney, Agent, or Firm*—Oblon, Spivak, McClelland, Maier & Neustadt

[57] ABSTRACT

A method for the production of polytetramethylene ether glycol wherein polymerization of tetrahydrofuran in the presence of fluorosulfonic acid is followed by hydrolysis of the resulting polymer, characterized by (1) using the fluorosulfonic acid at 0.007–0.3 molar equivalents with respect to the tetrahydrofuran;
(2) using in combination therewith fuming sulfuric acid which contains free sulfur trioxide at 0.05–1.0 molar equivalent with respect to the fluorosulfonic acid; and
(3) adding said fuming sulfuric acid to the tetrahydrofuran prior to adding the fluorosulfonic acid thereto.

According to the method, high quality polytetramethylene ether glycol with a low fluorine content may be obtained at a high yield without lowering the polymerization temperature. For example, PTMG may be obtained with 3 or fewer, and preferably 2 or fewer terminal fluorines per 2,000 termini of the resulting PTMG. As a result, when the resulting PTMG is used as a starting material for elastomers, it is possible to easily obtain a high molecular weight polymer with excellent heat resistance.

5 Claims, No Drawings

METHOD FOR THE PRODUCTION OF POLYTETRAMETHYLENE ETHER GLYCOL

FIELD OF THE INVENTION

The present invention relates to a method for the production of polytetramethylene ether glycol (hereunder abbreviated to PTMG), and more specifically, it relates to a method for the production of PTMG by polymerization of tetrahydrofuran (hereunder abbreviated to THF) with fluorosulfonic acid (hereunder abbreviated to FSA) as the catalyst, in order to obtain PTMG with a low fluorine content.

DESCRIPTION OF THE PRIOR ART

PTMG is used as a soft segment component in polyester elastomers, polyurethane elastomers, and the like. These elastomers are produced by condensation polymerization of PTMG with dicarboxylic acids (e.g. terephthalic acid) or dicarboxylic esters (e.g. dimethyl terephthalate), or by addition polymerization of PTMG with diisocyanates (e.g. diphenylmethane diisocyanate).

In these condensation polymerization and addition polymerization reactions, the terminal hydroxyl groups of the PTMG react with the carbonyl groups of dicarboxylic acid or isocyanato groups of diisocyanate. But fluorine is known to be present, albeit in small amounts, on the ends of PTMG instead of the terminal hydroxyl groups. The terminal fluorine in PTMG is inert to these reactions, and therefore for the production of high molecular weight polymers it is necessary to use PTMG with a low amount of terminal fluorine. Further the presence of the terminal fluorine lowers the heat resistance of PTMG-derived elastomers.

Particularly, the reaction temperature for the production of polyester elastomers exceeds 200° C., and thus the heat resistance of the polyester elastomers is important. The polyester elastomers which are produced in the greatest amounts at present are of terephthalate polyesters whose dicarboxylic acid component is terephthalic acid, and whose glycol components are 1,4-butanediol (hereunder abbreviated to 14BG) and PTMG. Of the constituent segments of these polyester elastomers, the problem of heat resistance occurs with the polyether chain portions.

For example, Japanese Patent Publication HEI 1-37408 shows that in the production of polyester elastomers by the direct esterification of terephthalic acid with 14BG and PTMG, if fluorine is present in the PTMG at an amount of 100 ppm or greater, then the resulting elastomer will have considerably inferior to heat resistance.

One of the most generally used methods for the production of PTMG is one in which THF is polymerized using FSA as the catalyst, and this is an industrially desirable method due to the high activity of the polymerization catalyst. In this method, $SO_3F$ groups are bonded to the ends of the polymer produced by the polymerization, and therefore after the polymerization reaction has been completed the resulting polymer is hydrolyzed to eliminate the end-bonded $SO_3F$ groups from the polymer.

However, the PTMG produced by this method still contains fluorine in minute amounts, although the $SO_3F$ groups are completely removed by the hydrolysis. (For example, fluorine has been detected at about 200 ppm in commercially available PTMG having molecular weights of about 1,000). This fluorine in the PTMG is assumed to be bonded directly to the terminal carbon of the polymer instead of the hydroxyl groups. This terminal fluorine cannot be easily eliminated by either the hydrolysis after polymerization or the neutralization and washing thereafter.

A method to minimize the terminal fluorine content in PTMG is described in EPC Publication 342862, whereby the PTMG is mixed with water and calcium hydroxide and heated at a temperature of 200°-300° C. However, in order to carry out this method a special equipment is required for the heating of PTMG at such high temperatures, and it is also disadvantageous from the point of view of energy consumption. Furthermore, there is the possibility of degradation of the PTMG.

In addition, it is known that, even when using FSA as catalyst, the polymer terminal fluorine in PTMG is kept to a minimum if the polymerization is conducted at a low temperature, but this method involves a low catalyst efficiency and requires a large amount of FSA, and thus is economically disadvantageous.

The polymerization of THF using fuming sulfuric acid as the catalyst is also known. In this method, the resulting PTMG does not contain fluorine, but in order to attain an adequate yield thereof it is necessary to maintain the reaction temperature at 10° C. or lower. Therefore, this method requires a freezer with large freezing capability, and thus it is economically disadvantageous. Furthermore, it is difficult to produce PTMG with a molecular weight of 1000 or greater, which is another drawback of this method.

It is already known, for example in U.S. Pat. No. 3,778,480, that the use of compounds containing fluorine in combination with the fuming sulfuric acid helps to compensate for the difficulty of producing the polymer of high molecular weights. Nevertheless, in these methods which use fuming sulfuric acid as one of the catalyst component, it is preferable to maintain the temperature for polymerization at 10° C. or lower. If these methods are carried out at higher than room temperature, then they bring notably reduced yield and become impractical.

Furthermore, there is described in Japanese Patent Application laid open SHO 48-999 a method for the production of PTMG in which fuming sulfuric acid is used together with FSA for the purpose of reducing the amount of FSA. In this method, the FSA and fuming sulfuric acid are added simultaneously to the THF, or the fuming sulfuric acid is added to the THF after addition of the FSA thereto. However, this document contains no reference in regards to the fluorine content of the resulting PTMG.

SUMMARY OF THE INVENTION

The object of the present invention is to achieve production of PTMG with a low fluorine content by using FSA, which is the most efficient catalyst for the THF polymerization reaction.

We, the inventors of the present invention have conducted extensive research with the aim of devising a method for the production of practically useful PTMG having a high molecular weight of 650-3,000, using FSA as the catalyst, in which the amount of terminal fluorine in the resulting PTMG is minimized, and as a result we have discovered that the fluorine content of the resulting PTMG may be vastly reduced by conducting the polymerization by adding first fuming sulfuric acid and then FSA to the THF.

The present invention is a method for the production of PTMG wherein polymerization of TBF in the presence of FSA is followed by hydrolysis of the resulting polymer, characterized by (1) using the FSA at 0.007–0.3 molar equivalents with respect to the THF;
(2) using in combination therewith fuming sulfuric acid which contains free sulfur trioxide ($SO_3$) at 0.05–1 molar equivalent with respect to the FSA; and
(3) adding the fuming sulfuric acid to the THF prior to adding the FSA thereto.

A detailed explanation of the present invention will now be provided.

DETAILED DESCRIPTION OF THE INVENTION

The present invention is essentially a method for the polymerization of THF using FSA as the catalyst. The FSA is used at 0.007–0.3 molar equivalents, and preferably 0.01–0.2 molar equivalents, with respect to the THF. According to the present invention, fuming sulfuric acid is also added to the THF. The fuming sulfuric acid must be added to the THF prior to the addition of the FSA, and it is added at an amount such that the content of free $SO_3$ in the fuming sulfuric acid corresponds to 0.05–1.0 molar equivalents, and preferably 0.2–0.8 molar equivalents, with respect to the FSA.

The THF may be used in any of its commercially available forms, but the water content thereof is restricted. This is because hydrogen fluoride is produced by the reaction of FSA with the water in THF, and this hydrogen fluoride is thought to result in the formation of C—F bonds at the ends of the polymer. The water in the THF is eliminated by its reaction with the added fuming sulfuric acid, but if the water content in the THF is too high, then the amount of fuming sulfuric acid which is consumed by this reaction becomes disadvantageously large. The THF to be used as a starting material generally has a water content of 200 ppm or less, and preferably 10–100 ppm.

The fuming sulfuric acid which is most easily obtainable as an industrial product has a free $SO_3$ content of about 25 wt %, i.e. a composition of 75 wt % of sulfuric acid and 25 wt % of free $SO_3$.

Considering the efficiency of the catalyst and the subsequent neutralization process, it is preferred that the concentration of free $SO_3$ in the fuming surfuric acid is high. However, at the addition of fuming surfuric acid with a high concentration of free $SO_3$ in the THF, there is a tendency towards carbonization and coloration of the THF and the free $SO_3$ concentration in the fuming surfuric acid is preferably 20–40 wt %.

As mentioned above, the amount of the fuming sulfuric acid to be used is such that the free $SO_3$ in the fuming surfuric acid is present at 0.05–1.0 molar equivalent with respect to the FSA. If the free $SO_3$ in the fuming sulfuric acid corresponds to a greater molar amount with respect to the FSA, then the major component of the catalyst becomes the fuming sulfuric acid and thus the temperature for polymerization must be maintained at a lower level in order to prevent a considerable reduction in the efficiency thereof. The fuming sulfuric acid acts as a dehydrating agent, and therefore when it is added to the THF, it is thought that the water contained in the THF disappears, thus inhibiting the reaction wherein the FSA which is added to the THF is decomposed by the water to produce hydrogen fluoride, and this in turn causes a reduction in the amount of terminal fluorine in the resulting PTMG. However, it is impossible to reduce the amount of the terminal fluorine in the resulting PTMG to a satisfactory degree by the addition of fuming sulfuric acid at an amount which is stoichiometrically required to eliminate the water in the THF. The mechanism by which the PTMG is produced with fluorine bonded to the ends thereof is as yet not fully made clear, and in order to produce PTMG with a low content of the terminal fluorine it is found necessary to add to the THF an amount of the fuming sulfuric acid which is greater than that required for dehydration. It is preferable to add to the THF in advance fuming sulfuric acid containing free $SO_3$ in 10 molar equivalents or more with respect to the water in the THF, afterwards adding the FSA thereto. Preferably 0.2–0.8 molar equivalents of free $SO_3$ with respect to the FSA is added to the THF as a starting material in the form of fuming sulfuric acid, then FSA is added thereto.

The polymerization is carried out at a temperature of 10° C. or higher. According to the present invention the main component of the catalyst is FSA, and despite the use of fuming sulfuric acid, PTMG may be produced at a high yield, for example, a yield of 50% or higher, without lowering the temperature too much.

In the polymerization method according to the present invention, generally a higher polymerization temperature tends to lower both the molecular weight and the yield of the resulting PTMG. Also, since the boiling point of THF is 66° C., a pressure reactor is required when the polymerization temperature is higher than 66° C.

Therefore, in the present invention, the reaction is usually conducted at a temperature of 10°–65° C., and preferably at 25°–45° C. The reaction time varies depending on the polymerization temperature, the amount of catalyst added, etc., but it is normally 1–10 hours.

In the present invention, although a catalyst is used whose main component is FSA, fuming sulfuric acid is added to the THF in advance of adding FSA to the THF, making it possible to easily produce PTMG with a very low fluorine content. For example, according to the present invention PTMG may be obtained with 3 or fewer, and preferably 2 or fewer terminal fluorines per 2,000 termini of the PTMG.

In the present invention, the addition of the fuming sulfuric acid to the THF prior to the addition of FSA thereto is critical, and although the FSA is normally added after adding the entire amount of the fuming sulfuric acid, it is not necessarily required that the entire amount of the fuming sulfuric acid is added to the THF in advance. For example, a major part of the fuming sulfuric acid may be added first to the THF, and then the remainder of the fuming sulfuric acid may be added thereto in the form of admixture with the FSA.

After completion of the polymerization reaction, a conventional method of post-treatment is effected to obtain the PTMG. For example, after the polymerization reaction, water is added thereto for hydrolysis at 50°–100° C. for 0.5–5 hours, to eliminate the terminal $SO_3F$ groups in the polymer. Next, the unreacted THF is distilled off, an alkali is added to the residue to neutralize the sulfuric, hydrofluoric and other acids, after which the solution is separated into PTMG phase and the aqueous phase. The PTMG phase is dehydrated by azeotropic distillation to obtain the PTMG.

A more detailed description of the present invention is provided below with reference to the Examples, but the present invention is not limited to the following Examples provided the gist thereof is maintained. In the Examples, "molecular weight" refers to the number average molecular weight determined by the titration method based on the phtalation method, and the terminal fluorine content of the PTMG was measured by the H-NMR method.

EXAMPLE 1-4

To 360 g of THF (water content approximately 50 ppm) was added dropwise while cooling fuming sulfuric acid containing 25 wt % of free $SO_3$ (25% oleum) in the amounts shown in Table 1, after which FSA was further added dropwise thereto. The temperature of the THF increased by the dropwise addition of the FSA. The polymerization was assumed to be initiated at the point when the systems reached the temperatures shown in Table 1, and the polymerization was continued at at these temperatures for the times shown in Table 1. After completion of the polymerization, the polymerization solution was mixed with 360 g of hot water at 60° C. to suspend the reaction, after which a hydrolysis reaction was conducted at 90° C. for 2 hours. Then, the unreacted THF was removed by distillation, after which calcium hydroxide was added thereto to neutralize the acids in the polymerization solution. A 100 g of toluene was added to the solution, and water contained therein was removed by azeotropic distillation. The toluene solution containing the dehydrated PTMG was filtered with a filter aid, after which the toluene was distilled off under reduced pressure to obtain about 200 g of PTMG.

The molecular weights, yields and number of terminal fluorine per 2,000 termini of the resulting PTMG are shown in Table 1.

COMPARISONS 1-5

The polymerization of THF was carried out in the same manner as in Example 1 under the conditions shown in Table 1, to obtain the results shown in Table 1.

Comparison 1 is a case in which only FSA was used as the catalyst.

Comparison 2 is a case in which fuming sulfuric acid was added to THF prior to the addition of FSA, but in an insufficient amount. The theoretical amount of fuming sulfuric acid (25% oleum) required for the elimination of the water in THF as a starting material was 0.32 g, and although the amount of fuming sulfuric acid used in Comparison 2 exceeded this amount, the fluorine content of the resulting PTMG was not sufficiently reduced.

Comparison 3 is a case in which fuming sulfuric acid and PSA were added to THF simultaneously.

Comparison 4 is a case in which FSA was first added to THF, and then fuming sulfuric acid was added thereto.

Comparison 5 is a case in which FSA and fuming sulfuric acid were mixed together for addition to THF.

TABLE 1

|  |  | Example 1 | Example 2 | Example 3 | Example 4 |
|---|---|---|---|---|---|
| Preparation | THF (g) | 360 | 360 | 360 | 360 |
|  | 25% oleum (g) | 27 | 21 | 16.5 | 40 |
|  | FSA (g) | 21 | 21 | 12.5 | 16.5 |
|  | $SO_3$/FSA (molar ratio) | 0.4 | 0.31 | 0.41 | 0.76 |
| Conditions | Temperature (°C.) | 35 | 35 | 40 | 35 |
|  | Time (hrs) | 5 | 4 | 5 | 5 |
| Product | Yield (%) | 56 | 53 | 62 | 48 |
|  | Molecular weight | 1040 | 980 | 2029 | 1008 |
|  | Number of terminal fluorines per 2,000 PTMG termini | 1.6 | 1.0 | 2.1 | 1.1 |
|  | Fluorine content (ppm) | 30 | 20 | 20 | 20 |

|  |  | Comparative Example 1 | Comparative Example 2 | Comparative Example 3 | Comparative Example 4 | Comparative Example 5 |
|---|---|---|---|---|---|---|
| Preparation | THF (g) | 360 | 360 | 500 | 360 | 360 |
|  | 25% oleum (g) | — | 2 | 21 | 27 | 27 |
|  | FSA (g) | 28 | 25 | 17.5 | 21 | 21 |
|  | $SO_3$/FSA (molar ratio) | — | 0.025 | 0.37 | 0.4 | 0.4 |
| Conditions | Temperature (°C.) | 45 | 45 | 30 | 35 | 35 |
|  | Time (hrs) | 5 | 5 | 2 | 5 | 5 |
| Product | Yield (%) | 56 | 53 | 59 | 54 | 53 |
|  | Molecular weight | 1040 | 1056 | 2050 | 1030 | 1040 |
|  | Number of terminal fluorines per 2,000 PTMG termini | 11 | 7 | 5.4 | 6.4 | 3.7 |
|  | Fluorine content (ppm) | 210 | 120 | 50 | 120 | 70 |

25% oleum = fuming sulfuric acid

As mentioned above, according to the present invention, it is possible to obtain, at a high yield, high quality PTMG with a low fluorine content without polymerization at low temperatures. For example, PTMG may be obtained with 3 or fewer, and preferably 2 or fewer terminal fluorines per 2,000 termini of the PTMG. As a result, when used as a starting material, for elastomers, it is possible to easily obtain a high molecular weight polymer with excellent heat resistance.

What is claimed is:

1. A method for the production of polytetramethylene ether glycol which comprises adding fuming sulfuric acid to tetrahydrofuran, then adding fluorosulfonic acid thereto, the fluorosulfonic acid being at 0.007-0.3 molar equivalent with respect to the tetrahydrofuran, the fuming sulfuric acid containing free sulfur trioxide at 0.05-1 molar equivalent with respect to the fluorosulfonic acid, whereby the tetrahydrofuran is polymerized, and then hydrolyzing the resultant polymer to yield polytetramethylene ether glycol wherein the number of terminal fluorines is 3 or less per 2,000 termini of said polymer.

2. The method according to claim 1, characterized by the fuming sulfuric acid being at an amount such that the content of the free sulfur trioxide is 0.2–0.8 molar equivalents with respect to the fluorosulfonic acid.

3. A method according to claim 1, characterized in that the polymerization temperature is 10°–65° C.

4. A method according to claim 1, characterized in that the tetrahydrofuran has a water content of 200 ppm or less.

5. A method according to claim 1, characterized in that the fluorosulfonic acid is added to the tetrahydrofuran after adding the fuming sulfuric acid which contains free sulfur trioxide in an amount of ten molar equivalents or greater with respect to the water contained in the THF.

* * * * *